JOHN J. HECOX.
CHEESE BOX.

No. 120,741.   Patented Nov. 7, 1871.

Witnesses.
Villette Anderson
F. B. Curtis

Inventor.
Jno. J. Hecox,
Chipman Hosmer & Co
Attys.

120,741

UNITED STATES PATENT OFFICE.

JOHN JEFFERS HECOX, OF LYONS, NEW YORK.

IMPROVEMENT IN CHEESE-BOXES.

Specification forming part of Letters Patent No. 120,741, dated November 7, 1871; antedated October 24, 1871.

*To all whom it may concern:*

Be it known that I, JOHN JEFFERS HECOX, of Lyons, in the county of Wayne and State of New York, have invented a new and valuable Improvement in Cheese-Boxes; and I do hereby declare that the following is a full, clear, and exact description of the construction and operation of the same, reference being had to the annexed drawing making a part of this specification, and to the letters and figures of reference marked thereon.

Figure 1:
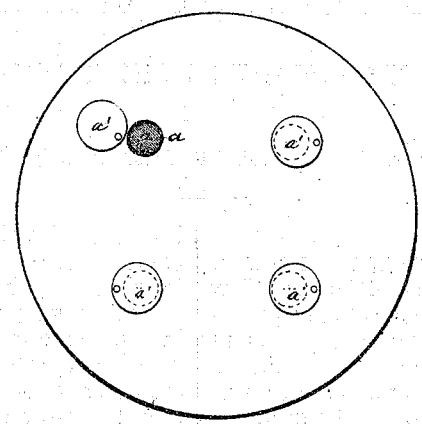
Figure 2:
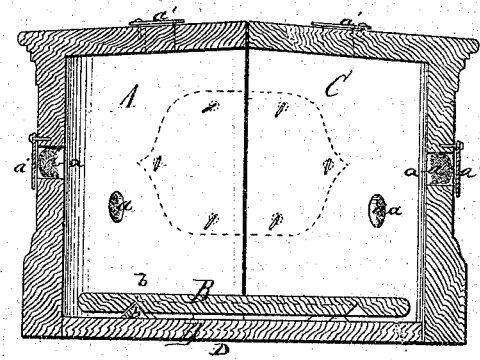
Figure 3:
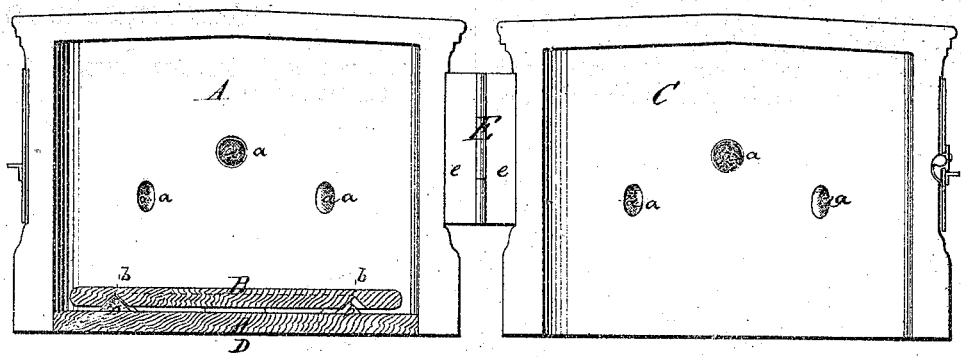

Figure 1 of the drawing is a top view of my invention. Fig. 2 is a vertical section of the same. Fig. 3 is an elevation, showing the box open.

This invention has relation to the improved construction of cheese-boxes in which the cheese is kept for use after being removed from the ordinary shipping packages; and it consists in constructing the box in two hinged semicircular halves, one of which has secured to it the bottom of the box, while the other is arranged to open and close. A turning platform is laid on the bottom of the box to hold the cake of cheese and allow it to be turned around according as it is cut away, and a number of holes cut in the sides and top and covered with wire-gauze, so as to allow the air to enter without giving an entrance to dirt or insects, buttons or covers being provided to close said holes.

In the accompanying drawing illustrating this invention, A C represent the semicircular hinged halves of the cheese-box, provided with gauze-covered holes $a$, which may be closed by the buttons $a'$. In winter these holes should be closed to keep the cheese from drying up, and in summer left open to prevent it from molding. D represents the bottom of the box, of a diameter to fit the interior of it. This bottom is secured to the part A. B designates a platform with a circular groove cut in its under side, by means of which it turns on a circular ridge or row of studs, $b$. By this arrangement the platform it is held steadier than by an ordinary central pivot. E shows the hinge connecting the halves A C. One or both the wings $e$ are attached to the box a short distance from the joint, so as to allow the latter to close tightly. F is a latch opposite the hinge for locking the halves together.

Having fully described my invention, I claim—

A cheese-box composed of the hinged parts A C, having the gauze ventilators and covers, and the bottom D provided with movable platform B rotating in a guiding-groove and series of ridges, as specified.

In testimony that I claim the above I have hereunto subscribed my name in the presence of two witnesses.

JOHN JEFFERS HECOX.

Witnesses:
GEORGE W. ELLSWORTH,
CHAS. CROUL. (45)